United States Patent [19]
Kawasaki et al.

[15] 3,673,165
[45] June 27, 1972

[54] PROCESS FOR PREPARING AN ALTERNATING COPOLYMER OF BUTADIENE AND ACRYLONITRILE

[72] Inventors: Akihiro Kawasaki, Ichihara; Hiroaki Ueda, Chiba; Masanobu Taniguchi, Ichihara, all of Japan

[73] Assignee: Maruzen Petrochemical Co., Ltd., Tokyo, Japan

[22] Filed: April 16, 1970

[21] Appl. No.: 29,300

[30] Foreign Application Priority Data

April 28, 1969 Japan..............................44/33036
May 31, 1969 Japan..............................44/42082
May 31, 1969 Japan..............................44/42083
May 31, 1969 Japan..............................44/42086

[52] U.S. Cl. ............................................................260/82.5
[51] Int. Cl. ........................C08d 1/14, C08d 3/04, C08d 3/06
[58] Field of Search..................................................260/82.5

[56] References Cited

FOREIGN PATENTS OR APPLICATIONS 1,487,211  5/1967  France..................................260/82.5
1,123,724  8/1968  Great Britain........................260/82.5

OTHER PUBLICATIONS

Symposium of Japanese Chemical Fiber Institute October 1968, No. 26, p. 83– 96 Furakawa et al.
Bull. Insti. Chem. Res., Kyoto Univ., Vol. 47, No. 3, pages 222– 238; Furakawa et al., May 1969.

*Primary Examiner*—Joseph L. Schofer
*Assistant Examiner*—William F. Hamrock
*Attorney*—Flynn & Frishauf

[57] ABSTRACT

A process for preparing an alternating copolymer of butadiene and acrylonitrile which comprises contacting butadiene and acrylonitrile in liquid phase with a catalyst, said catalyst comprises the first component selected from the group consisting of an aluminum halide and a zinc halide, a vanadium compound as the second component and the third component selected from the group consisting of an organo-aluminum compound, an organozinc compound and an organolithium compound. The alternating copolymers obtained by this invention are rubber-like in character and are useful in the field of rubber, plastics industries, etc.

9 Claims, No Drawings

PROCESS FOR PREPARING AN ALTERNATING COPOLYMER OF BUTADIENE AND ACRYLONITRILE

This invention relates to a new process of polymerizing butadiene and acrylonitrile and more particularly to a new process of preparing an alternating copolymer of butadiene and acrylonitrile which shows high elasticity. The alternating copolymer is easily soluble in some kinds of organic solvents. It shows also higher rubber-like elasticity than the corresponding random copolymer. It is useful in the field of rubber, plastics industries, etc.

Recently, Furukawa et. al. (J. Polymer Sci. B7, 47 (1969); Nippon Kagaku Sen-i Kenkyu Sho Koenkai, Osaka, Oct., 1968) reported the process for preparing an alternating copolymer of butadiene and acrylonitrile showing rubber-like elasticity. The system comprising of ethylaluminum dichloride acrylonitrile complex and vanadium (V) oxychloride was used as the catalyst.

As far as the inventors know, with the exception of Furukawa et al., there is no prior art in connection with the process for preparing an alternating copolymer of butadiene and acrylonitrile.

The object of the present invention is to provide new catalytic systems for the production of alternating copolymer of butadiene and acrylonitrile in high yield.

In accordance with this invention, we have found that by using either one of the catalyst system of 1. an aluminum halide — a vanadium compound — an organoaluminum compound,
2. an aluminum halide — a vanadium compound — an organozinc compound,
3. an aluminum halide — a vanadium compound — an organolithium compound,
4. a zinc halide — a vanadium compound — an organoaluminum compound,
5. a zinc halide — a vanadium compound — an organozinc compound and
6. a zinc halide — a vanadium compound — an organolithium compound, an alternating copolymer of butadiene and acrylonitrile can be produced in high yield.

The aluminum halides used as the first component of the present invention may be defined by the formula $AlX_3$ wherein X is chlorine, bromine or iodine. The zinc halides which form the other first component of the present invention may be defined by the formula $ZnX_2$ wherein X is chlorine, bromine or iodine. The vanadium compounds which form the second component of the catalyst of this invention are vanadium (V) oxyalkoxide compounds having the general formula of $OV(OR)_n X_{3-n}$ wherein R is a hydrocarbon radical such as alkyl radical, aryl radical or cycloalkyl radical, X is chlorine, bromine or iodine and $n$ is 1, 2 or 3; vanadium (IV) halide having the general formula of $VX_4$ wherein X is chlorine, bromine or iodine; vanadium (V) oxyhalide having the general formula of $VOX_3$ wherein X is chlorine, bromine or iodine; vanadium complex such as dicyclopentadienyl vanadium, vanadium oxydiacetylacetonate, vanadium triacetylacetonate, vanadium cyclopentadienyl tetracarbonyl; etc. The organoaluminum compounds which form the third component of the catalyst of this invention may be defined by the formula $AlR_n X_{3-n}$ wherein R is a hydrocarbon radical such as alkyl radical, aryl radical or cycloalkyl radical, X is chlorine, bromine or iodine and n is 1, 1.5, 2 or 3. The organozinc compounds which form the other third component of the catalyst of this invention may be defined by the formula $Zn R_2$ wherein R is a hydrocarbon radical such as alkyl radical, aryl radical or cycloalkyl radical. The organolithium compounds which form the other third component of this invention may be defined by the formula LiR wherein R is a hydrocarbon radical such as alkyl radical, aryl radical or cycloalkyl radical. The quantity of the three components of this invention may be varied over a wide range. However, in the catalyst system of an aluminum halide, a vanadium compound and an organoaluminum compound, the molar ratio of an aluminum halide to an organoaluminum compound $AlX_3/AlR_n X_{-n}$) is critical. In the preferred embodiment the molar ratio of an aluminum halide to an organoaluminum compound having the general formula of $AlR_3$ should be equal to 2 or higher than 2 ($AlX_3/AlR_3 \geq 2$), the molar ratio of an aluminum halide to an organoaluminum compound having the general formula of $AlR_2X$ should be equal to 1 or higher than 1 ($AlX_3/AlR_2X \geq 1$) and the molar ratio of an aluminum halide to an organoaluminum compound having the general formula of $AlR_{1.5}X_{1.5}$ should be equal to 1 or higher than 1 ($AlX_3/AlR_{1.5}X_{1.5}$).

Hydrocarbons, such as heptane, octane, isooctane, benzene, toluene, etc.; chlorinated hydrocarbons, such as methylene chloride, ethylene chloride, tetrachloroethane, tetrachloroethylene, ethylchloride, trichloroethylene, trichloroethane, etc.; or a mixture of such diluents are used as diluent in preparing the catalyst. The diluent should be pretreated to remove harmful impurities which may be often contained therein. The presence of moisture, sulphur, sulphur-containing compounds and oxygen would act as harmful impurities. In actual practice, it is preferred that such impurities should not be present in the diluent or in the monomer which is to be copolymerized.

The preparation of the new alternating copolymer of butadiene and acrylonitrile is carried out by contacting a mixture of the monomers in liquid phase with the catalyst system described above. The copolymerization reaction is generally carried out in the presence of a liquid organic diluent. Suitable diluents that can be used for the copolymerization are hydrocarbons, such as heptane, octane, isooctane, benzene, toluene, etc.; chlorinated hydrocarbons, such as methylene chloride, ethylene chloride, tetrachloroethane, tetrachloroethylene, ethylchloride, trichloroethylene, trichloroethane, etc.; or a mixture of such diluents. The diluent should also be pretreated to remove harmful impurities which may be contained therein.

The temperature of the copolymerization process can be varried over a wide range, generally from $-100°$ C. to $+60°$ C. and preferably from $-78°$ C. to $+40°$ C. Sufficient pressure is employed to keep the monomers in liquid condition regardless whether a diluent is present in the reaction mixture or not.

In general, the molar ratio of butadiene to acrylonitrile in the initial monomer composition will be from 20:80 to 80:20 and more usually be 50:50.

After the copolymerization is complete, the reaction product is separated from the reaction tube and treated to separate the diluent and unreacted monomer. The alternate copolymer is then treated to remove the catalyst residues, said treatment may comprise washing with an acidified methanol. The acid which is used to acidify methanol is a mineral acid such as hydrochloric acid. Thereafter the alternate copolymer may be washed with methanol several times and may be dried under vacuum.

The composition of the copolymer obtained by the process of the present invention according to elementary analysis substantially agrees well with the calculated value for the 1:1 copolymer of butadiene and acrylonitrile. The copolymerization reaction gave 1:1 copolymer over a wide range of initial monomer composition and also independently of polymerization time. The microstructure of butadiene unit in the copolymer was all trans-configuration. The NMR spectrum of the copolymer was shown to be very different from that of the conventional ultra high nitrile (acrylonitrile content 48 mole percent random copolymer of butadiene and acrylonitrile prepared by the prior art. Two strong peaks were observed at 7.71 $\digamma$ and 7.89 $\digamma$ in the NMR spectrum of the conventional ultra high nitrile random copolymer. On the other hand in the NMR spectrum of the copolymer in this invention only one strong peak appeared at 7.71 $\digamma$ in this region. This means that block sequence of butadiene-butadiene is not substantially included. Consequently, each fact mentioned above supports the assumption that the present copolymer should be an alternating copolymer of butadiene and acrylonitrile.

The alternating copolymer is easily soluble in chloroform, acetone and dimethylformamide at room temperature.

The invention will be illustrated with reference to the following Examples.

EXAMPLE 1

In Exp. No. 1 – 7 and Ref. 6 of Table 1, the usual dry, air-free technique was employed and 2.0 milliliters toluene, 25.0 millimoles acrylonitrile, a mixture of varying amounts of aluminum chloride and 1.0 milliliter methylene chloride and varying amounts of triethylaluminum solution in toluene (1.0 molar solution) were put successively in a 25 milliliters glass bottle at room temperature. Then the bottle was held in a low temperature bath at −78° C. and varying amounts of vanadium compound and 25.0 millimoles butadiene were put successively into the bottle also employing the usual, dry, air-free technique. Thereafter the bottle was sealed and the monomers were allowed to copolymerize at 25° C. for 17 hours. The results were summarized in Table 1.

In Ref. 1–3, the usual, dry, air-free technique was employed and 2.0 milliliters toluene, 25.0 millimoles acrylonitrile and 1.0 milliliter diethylaluminum monochloride or ethylaluminum dichloride solution in toluene (1.0 molar solution) or a mixture of 1.0 millimole aluminum chloride and 1.0 milliliter methylene chloride were put successively in a 25 milliliters glass bottle at room temperature. Then the bottle was held in a low temperature bath at −78° C. and 0.02 millimole vanadium (V) oxychloride and 25.0 millimoles butadiene were put successively into the bottle also employing the usual, dry, air-free technique. Thereafter the bottle was sealed and the monomers were allowed to copolymerize at 25° C. for 17 hours.

Ref. 1 and Ref. 2 show the results obtained by the method reported by Furukawa et al. and the activity of the catalyst system in Ref. 1 is higher than that of the catalyst system in Ref. 2.

The molar ratio of aluminum chloride to triethylaluminum in Exp. No. 4 is 2/1 and 0.99 millimole ethylaluminum dichloride may be produced if the following reactions proceed completely;

$$0.66 AlCl_3 + 0.33 AlEt_3 \longrightarrow 0.33 AlCl_3 + 0.33 AlEtCl_2 + 0.33 AlEt_2Cl$$
$$\longrightarrow 0.66 AlEtCl_2 + 0.33 AlEtCl_2$$
$$\longrightarrow 0.99 AlEtCl_2$$

On the other hand the activity of the catalyst system in Exp. No. 4 is apparently higher than that of the catalyst system in Ref. 1. Moreover, in practice, the reactions described above does not proceed completely in the catalyst system and unreacted aluminum chloride should be remained in the system. These results mean that the catalyst system in Ref. 1 is quite different from the catalyst system in Exp. No. 4. As can be seen in Exp. No. 1 – Exp. No. 4, by varying the molar ratio of aluminum chloride to triethylaluminum the yield of alternating copolymer per aluminum atom or organoaluminum compound in the catalyst system can be varried. In Ref. 6, the molar ratio of aluminum chloride to triethylaluminum is 1/1.

EXAMPLE 2

Employing the usual, dry, air-free technique, 3.0 milliliters toluene, varying amounts of aluminum chloride, varying amounts of triethylaluminum solution in heptane (2.0 molar solution) and 25.0 millimoles acrylonitrile were put successively in a 25 milliliters glass bottle at room temperature. Then the bottle was held in a low temperature bath at −78° C. and 0.02 millimole vanadium compound and 25.0 millimoles butadiene were put successively into the bottle also employing the usual, dry, air-free technique. Thereafter the bottle was sealed and the monomers were allowed to copolymerize at 25° C. for 17 hours. The results were summarized in Table 2.

TABLE 2

| | Catalyst | | | Alternating copolymer | | |
|---|---|---|---|---|---|---|
| Exp. No. | AcCc₃ (mmol.) | AcEt₃ (mmol.) | Vanadium compound (mmol.) | Yield (g.) | Yield per aluminum atom in the catalyst (g./mmol.) | Yield per organoaluminum compound (g./mmol.) |
| 1 | 0.8 | 0.2 | VOCc₃ 0.02 | 0.80 | 0.80 | 4.00 |
| 2 | 0.8 | 0.2 | VO(OEt)₃ 0.02 | 1.28 | 1.28 | 6.40 |
| Ref. 1 | 0.5 | 0.5 | VO(OEt)₃ 0.02 | 0.55 | 0.55 | 1.10 |

EXAMPLE 3

Employing the usual, dry, air-free technique, 2.0 milliliters toluene, varying amounts of diethylaluminum monochloride solution in toluene (1.0 molar solution) and a mixture of varying amounts of aluminum chloride and 25.0 millimoles acrylonitrile were put successively in a 25 milliliters glass bottle at room temperature. Then the bottle was held in a low temperature bath at −78° C and 0.04 milliliter vanadium (V) oxychloride solution in toluene (1.0 molar solution) and 25.0 millimoles butadiene were put successively into the bottle also employing the usual, dry, air-free technique. Thereafter the bottle was sealed and the monomers were allowed to copolymerize at 25° C. for 16 hours. The results are summarized in Table 3.

In Ref. 1 and Ref. 2, the usual, dry, air-free technique was employed and 2.0 milliliters toluene, 1.0 milliliter ethylaluminum dichloride or diethyl-aluminum monochloride solution in toluene (1.0 molar solution) and 25.0 millimoles acrylonitrile were put successively in a 25 milliliters glass bottle at room temperature. Then the bottle was held in a low temperature bath −78° C. and 0.04 milliliter vanadium (V) oxychloride solution in toluene (1.0 molar solution) and 25.0

TABLE 1

| | Catalysts | | | | Alternating copolymer | | |
|---|---|---|---|---|---|---|---|
| Exp. No. | AcCc₃ (mmol.) | AcEtCc₂ or AcEt₂Cc (mmol.) | AcEt₃ (mmol.) | Vanadium compound (mmol.) | Yield (g.) | Yield per aluminum atom on the catalyst (g./mmol.) | Yield per organoaluminum compound (g./mmol.) |
| 1 | 1.0 | | 0.1 | VOCc₃ 0.02 | 0.88 | 0.80 | 8.80 |
| 2 | 1.0 | | 0.2 | VOCc₃ 0.02 | 1.15 | 0.96 | 5.75 |
| 3 | 1.0 | | 0.4 | VOCc₃ 0.02 | 1.07 | 0.76 | 2.68 |
| 4 | 0.66 | | 0.33 | VOCc₃ 0.02 | 0.76 | 0.77 | 2.30 |
| Ref. 1 | | AcEtCc₂ 1.0 | | VOCc₃ 0.02 | 0.55 | 0.55 | 0.55 |
| Ref. 2 | | AcEt₂Cc 1.0 | | VOCc₃ 0.02 | 0.13 | 0.13 | 0.13 |
| Ref. 3 | 1.0 | | | VOCc₃ 0.02 | 0.18 | 0.18 | |
| Ref. 4 | 1.0 | | | | 0.38 | 0.32 | 1.90 |
| Ref. 5 | 1.0 | | 0.2 | | 0.07 | 0.07 | |
| Ref. 6 | 1.0 | | 1.0 | VOCc₃ 0.02 | 0.61 | 0.31 | 0.61 |
| 5 | 1.0 | | 0.2 | VO(OEt)₃ 0.02 | 1.72 | 1.43 | 8.60 |
| 6 | 1.0 | | 0.2 | VO(OEt)₃ 0.10 | 1.36 | 1.13 | 6.80 |
| 7 | 1.0 | | 0.2 | V(acac)₃ 0.04 | 1.15 | 0.96 | 5.75 | millimoles butadiene were put successively into the bottle also employing the usual, dry, air-free technique. Thereafter the bottle was sealed and the monomers were allowed to copolymerize at 25° C. for 16 hours.

If the following reaction proceeds completely in the catalyst system in Exp. No. 4;

$$0.5 \text{ AlCl}_3 + 0.5 \text{ AlEt}_2\text{Cl} \rightarrow \text{AlEtCl}_2,$$

1.0 millimole ethylaluminum dichloride should be produced in the catalyst system. On the other hand the activity of the catalyst system in Exp. No. 4 is higher than that of the catalyst system in Ref. 2. Moreover, in practice, the reaction described above does not proceed completely in the catalyst system and unreacted aluminum chloride should be remained in the system. These results mean that the catalyst system in Exp. No. 4 is quite different from the catalyst system in Ref. 2.

EXAMPLE 5

The usual, dry, air-free technique was employed and varying amounts of toluene, 25.0 millimoles acrylonitrile and a mixture of 8.0 millimoles zinc chloride and 1.0 milliliter methylene chloride and 0.2 milliliter organoaluminum compound solution in toluene (1.0 molar solution) were put successively in a 25 milliliters glass bottle at room temperature. Then the bottle was held in a low temperature bath at −78° C. and varying amounts of vanadium compound and 25.0 millimoles butadiene were put successively into the bottle also employing the usual, dry, air-free technique. Thereafter the bottle was sealed and the monomers were allowed to copolymerize at 25° C. for 17 hours. The results are summarized in Table 5.

TABLE 5

| Exp. No. | Diluent toluene (ml.) | Catalysts ||| Yield of alternating copolymer |
|---|---|---|---|---|---|
| | | $ZnCl_2$ (mmol.) | Organoaluminum compound (mmol.) | Vanadium compound (mmol.) | |
| 1 | 2.3 | 8.0 | $AlEt_3$ 0.2 | $VOCl_3$ 0.02 | 2.45 |
| Ref. 1 | 2.3 | | $AlEt_3$ 0.2 | $VOCl_3$ 0.02 | 0 |
| 2 | 1.8 | 8.0 | $AlEt_3$ 0.2 | $VOCl_3$ 0.50 | 0.80 |
| 3 | 1.8 | 8.0 | $AlEtCl_2$ 0.2 | $VOCl_3$ 0.50 | 0.66 |
| Ref. 2 | 1.8 | | $AlEtCl_2$ 0.2 | $VOCl_3$ 0.50 | 0 |
| 4 | 2.3 | 8.0 | $AlEt_3$ 0.2 | $V(acac)_3$ 0.02 | 0.20 |
| Ref. 3 | 2.3 | | $AlEt_3$ 0.2 | $V(acac)_3$ 0.02 | 0 |
| Ref. 4 | 2.3 | 8.0 | | $VOCl_3$ 0.02 | 0 |

TABLE 3

| | Catalyst ||| Alternating copolymer |||
|---|---|---|---|---|---|---|
| Exp. No. | $AcCe_3$ (mmol.) | $AcEt_2Ce_2$ or (mmol.) | $VOCe_3$ (mmol.) | Yield (g.) | Yield per aluminum atom in the catalyst (g./mmol.) | Yield per organoaluminum compound (g./mmol.) |
| 1 | 0.5 | $AcEt_2Ce$ 0.4 | 0.04 | 0.85 | 0.85 | 2.13 |
| 2 | 0.75 | $AcEt_2Ce$ 0.25 | 0.04 | 1.17 | 1.17 | 4.68 |
| 3 | 0.9 | $AcEt_2Ce$ 0.1 | 0.04 | 0.75 | 0.75 | 7.50 |
| 4 | 0.5 | $AcEt_2Ce$ 0.5 | 0.04 | 0.83 | 0.83 | 1.66 |
| Ref. 1 | | $AcEt_2Ce$ 1.0 | 0.04 | 0.15 | 0.15 | 0.15 |
| Ref. 2 | | $AcEtCe_2$ 1.0 | 0.04 | 0.53 | 0.53 | 0.53 |

EXAMPLE 4

The usual, dry, air-free technique was employed and 2.0 milliliters toluene, varying amounts of ethyl-aluminum dichloride solution in toluene (1.0 molar solution) and a mixture of varying amounts of aluminum chloride and 25.0 millimoles acrylonitrile were put successively in a 25 milliliters glass bottle at room temperature. Then the bottle was held in a low temperature bath at −78° C. and 0.04 milliliter vanadium (V) oxychloride solution in toluene (1.0 molar solution) and 25.0 millimoles butadiene were put successively into the bottle also employing the usual, dry, air-free technique. Thereafter the bottle was sealed and the monomers were allowed to copolymerize at 25° C. for 16 hours. The results are summarized in Table 4.

In Ref. 1 and Ref. 2, the usual, dry, air-free technique was employed and 2.0 milliliters toluene, 1.0 milliliter ethylaluminum dichloride solution in toluene (1.0 molar solution) or 1.0 millimole aluminum chloride and 25.0 millimoles acrylonitrile were put successively in a 25 milliliters glass bottle at 25° C. Then the bottle was sealed and the monomers were allowed to copolymerize at 25° C. for 16 hours.

The catalyst activity in Exp. No. 1 or Exp. No. 2 is apparently higher than that in Ref. 1.

EXAMPLE 6

The usual, dry, air-free technique was employed and 3.0 milliliters toluene, a mixture of 25.0 millimoles acrylonitrile and 1.0 millimole aluminum chloride and varying amounts of organometallic compound were put successively in a 25 milliliters glass bottle at room temperature. Then the bottle was held in a low temperature bath at −78° C. and 0.02 millimole vanadium compound and 25.0 millimoles butadiene were put successively into the bottle also employing the usual, dry, air-free technique. Thereafter the bottle was sealed and the monomers were allowed to copolymerize at 25° C. for 17 hours. The results are summarized in Table 6.

TABLE 6

| Exp. No. | Catalysts |||  Yield of alternating copolymer (g.) |
|---|---|---|---|---|
| | $AlCl_3$ (mmol.) | Organometallic compound (mmol.) | Vanadium compound (mmol.) | |
| 1 | 1.0 | BuLi 0.4 | $VOCl_3$ 0.02 | 0.53 |
| 2 | 1.0 | $ZnEt_2$ 0.4 | $VOCl_3$ 0.02 | 0.98 |
| 3 | 1.0 | $ZnEt_2$ 0.4 | $V(acac)_3$ 0.02 | 0.58 |
| Ref. 1 | 1.0 | | $VOCl_3$ 0.02 | 0.18 |
| Ref. 2 | 1.0 | | $V(acac)_3$ 0.02 | 0.13 |

TABLE 4

| | Catalysts ||| Alternating copolymer |||
|---|---|---|---|---|---|---|
| Exp. No. | $AlCl_3$ (mmol.) | $AlEtCl_2$ (mmol.) | $VOCl_3$ (mmol.) | Yield (g.) | Yield per aluminum atom in the catalyst (g./mmol.) | Yield per organoaluminum compound (g./mmol.) |
| 1 | 0.5 | 0.5 | 0.04 | 0.93 | 0.93 | 1.86 |
| 2 | 0.6 | 0.3 | 0.04 | 0.71 | 0.72 | 2.37 |
| Ref. 1 | | 1.0 | 0.04 | 0.53 | 0.53 | 0.53 |
| Ref. 2 | 1.0 | | 0.02 | 0.18 | 0.18 | |

EXAMPLE 7

The usual, dry, air-free technique was employed and varying amounts of toluene, 25.0 millimoles acrylonitrile, a mixture of 8.0 millimoles zinc chloride and 1.0 milliliter methylene chloride or 1.0 millimole zinc chloride and varying amounts of diethylzinc solution in toluene (1.0 molar solution) were put successively in a 25 milliliters glass bottle at room temperature. Then the bottle was held in a low temperature bath at 25° C. and 0.02 millimole vanadium compound and 25.0 millimoles butadiene were put successively into the bottle also employing the usual, dry, air-free technique. Thereafter the bottle was sealed and the monomers were allowed to copolymerize at 25° C. for 17 hours. The results were summarized in Table 7.

TABLE 7

| Exp. No. | Diluent | | Catalysts | | | | Yield of alternating copolymer (g.) |
|---|---|---|---|---|---|---|---|
| | Toluene (ml.) | Methylene chloride (ml.) | $ZnCl_2$ (mmol.) | $ZnEt_2$ (mmol.) | Vanadium compound (mmol.) | | |
| 1 | 3.0 | | 1.0 | 0.2 | $V(acac)_3$ | 0.02 | 0.50 |
| 2 | 2.3 | 1.0 | 8.0 | 0.2 | $VOCl_3$ | 0.02 | 2.22 |
| 3 | 0.5 | 1.0 | 8.0 | 2.0 | $VOCl_3$ | 0.02 | 1.14 |
| Ref. 1 | 2.5 | 1.0 | 8.0 | | $VOCl_3$ | 0.02 | 0 |
| Ref. 2 | 2.5 | | | 2.0 | $VOCl_3$ | 0.02 | 0 |

What we claim is:

1. A process for preparing a 1:1 copolymer of butadiene and acrylonitrile having alternating butadiene and acrylonitrile units, which comprises contacting butadiene and acrylonitrile in non-aqueous liquid phase with a catalyst, said catalyst comprising component A, component B and component C wherein component A is an aluminum halide having the formula $AlX_3$ or a zinc halide having the formula $ZnX_2$ wherein X is chlorine, bromine or iodine; component B is selected from the group consisting of $OV(OR)_nX_{3-n}$, $VX_4$, $VOX_3$, dicyclopentadienyl vanadium, vanadium cyclopentadienyl tetracarbonyl, vanadium triacetylacetonate and vanadium oxydiacetylacetonate wherein R is an alkyl, an aryl or a cycloalkyl radical, X is chlorine, bromine or iodine and $n$ is 1, 2 or 3, and component C is $AlR_nX_{3-n}$, $ZnR_2$ or LiR wherein R is an alkyl, an aryl or a cycloalkyl radical, X is chlorine, bromine or iodine and n is 1, 1.5, 2 or 3, wherein the molar ratio of component A to component C is at least 2 when component C is $AlR_3$, the molar ratio of component A to component C is at least 1 when component C is $AlR_2X$, and the molar ratio of component A to component C is at least 1 when component C is $AlR_{1.5}X_{1.5}$.

2. A process of claim 1 wherein said component A is an aluminum halide and said component C is a compound having the formula $AlR_3$.

3. A process of claim 1 wherein said component A is an aluminum halide and said component C is a compound having the formula $AlR_2X$.

4. A process of claim 1 wherein said component A is an aluminum halide and said component C is a compound having the formula $AlR_{1.5}X_{1.5}$.

5. A process of claim 1 wherein said component A is an aluminum halide and said component C is a compound having the formula $AlRX_2$.

6. A process of claim 1 wherein said contact is carried out in the presence of a diluent selected from the group consisting of a hydrocarbon, chlorinated hydrocarbon and a mixture thereof.

7. A process of claim 1 wherein the molar ratio of butadiene to acrylonitrile in the initial monomer composition is within a range of from 20:80 to 80:20.

8. A process of claim 1 wherein said contact is conducted at a temperature is of from −100° C. to +60° C.

9. A process of claim 1 wherein said contact is carried out at a temperature of from −100° C. to +60° C. and in the presence of a diluent selected from the group consisting of a hydrocarbon, chlorinated hydrocarbon and a mixture thereof.

* * * * *